UNITED STATES PATENT OFFICE.

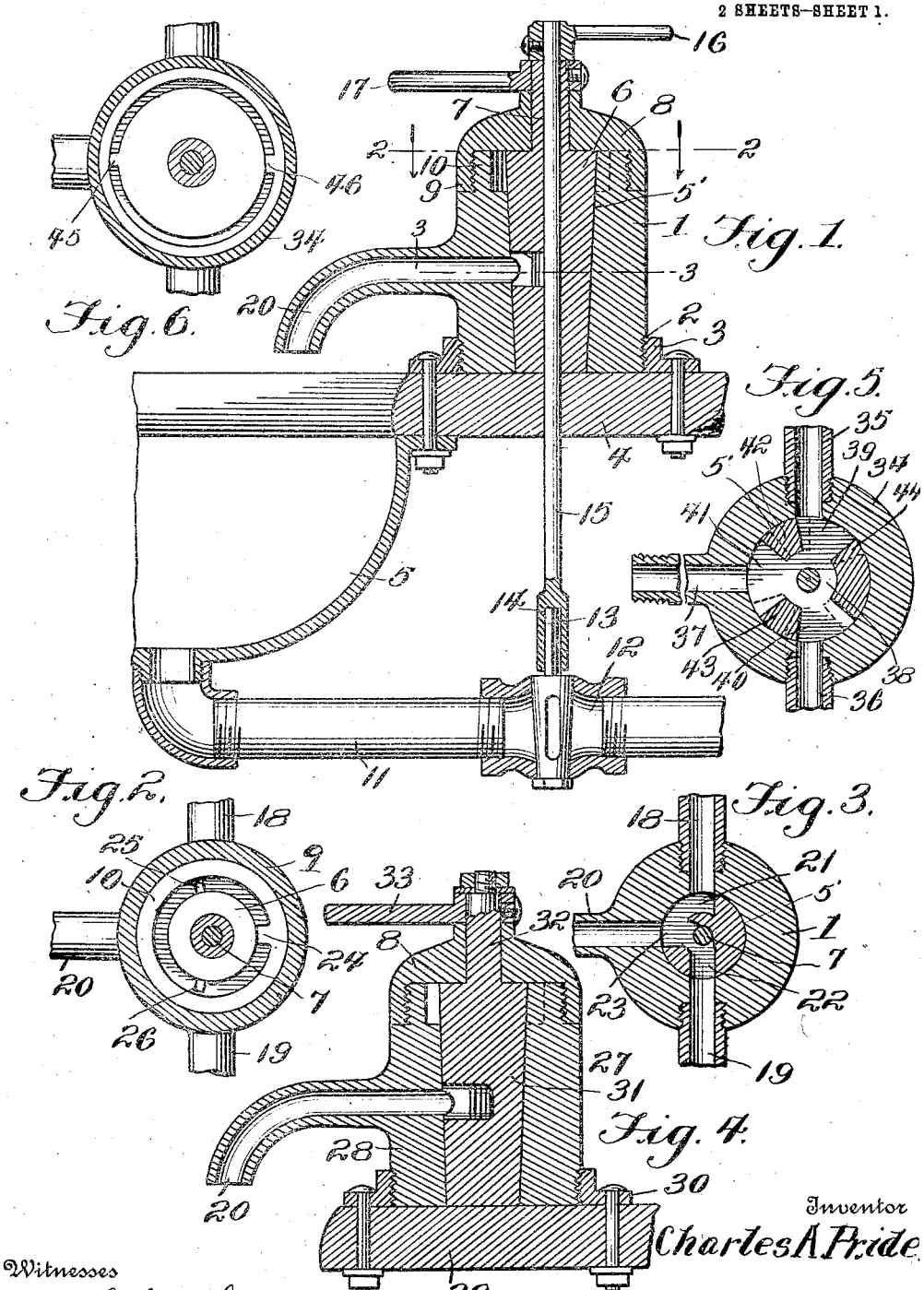

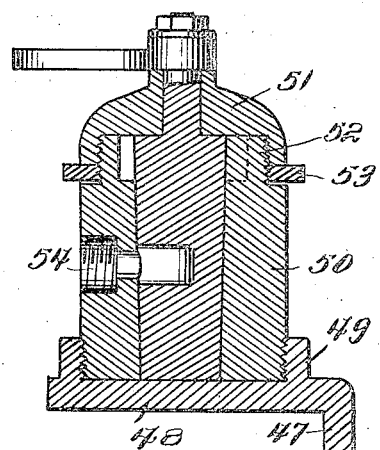
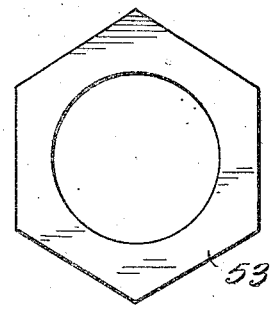
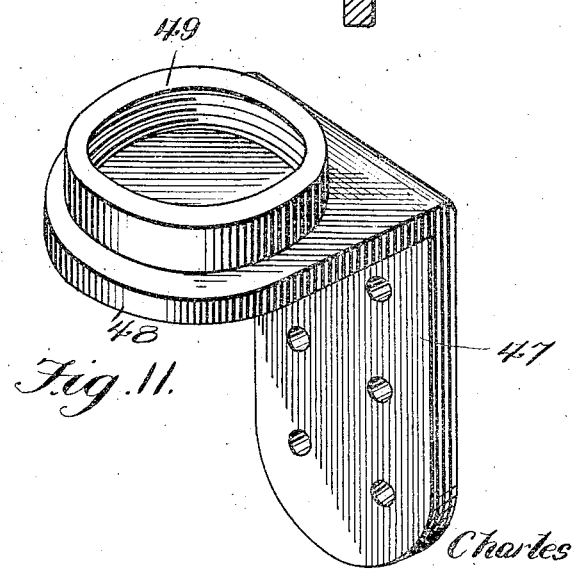

CHARLES A. PRIDE, OF TOMPKINSVILLE, NEW YORK.

FAUCET.

988,504.      Specification of Letters Patent.      Patented Apr. 4, 1911.

Application filed October 30, 1909. Serial No. 525,421.

*To all whom it may concern:*

Be it known that I, CHARLES A. PRIDE, a citizen of the United States, residing at Tompkinsville, in the county of Richmond and State of New York, have invented new and useful Improvements in Faucets, of which the following is a specification.

This invention relates to faucets, the object being to provide a combined faucet and drain valve both of which are operable independently by separate and distinct actuating means.

Another object of the invention is to provide a faucet with novel means whereby it can be connected with hot or cold water connections, means being provided whereby the valve of the faucet can be operated, whereby its ports can register with both the hot and cold water connections or with either one of the said connections.

Other objects and advantages will be apparent as the nature of the invention is better disclosed and it will of course be understood that changes within the specific scope of the claim may be made without departing from the spirit of the invention.

In the drawings forming a portion of this specification and in which like numerals of reference indicate similar parts in the several views,—Figure 1 is a sectional elevation of my improved faucet showing its application to a basin. Fig. 2 is a section taken on the line 2—2 of Fig. 1. Fig. 3 is a section taken on the line 3—3 of Fig. 1. Fig. 4 is a detail vertical section of a slightly modified form of my invention. Figs. 5 and 6 illustrate transverse sections through a slightly modified form of valve. Fig. 7 is a vertical section through a still further modified form of valve. Figs. 8 and 9 are detail views of two forms of discharge nozzles. Fig. 10 is a plan view of the clamping nut. Fig. 11 is a detail perspective view of the supporting bracket.

My improved faucet as illustrated particularly in Fig. 1, comprises a casing 1 which is provided with an exteriorly threaded lower portion 2 which is adapted to be engaged in a correspondingly threaded passage in a member 3, the latter being fastened in any suitable manner upon the shelf portion 4 of a wash bowl or basin 5. The casing 1 is provided with a tapered bore 5' in which is revolubly mounted a correspondingly formed plug valve 6. This valve is formed with a vertical stem 7 which extends upward through a passage which is formed in a removable cap member 8. The cap member is provided with an annular interiorly threaded depending flange 9 which is engaged with the exteriorly threaded flange 10 at the upper end of the valve casing.

The basin or bowl 5 is provided with the usual drain pipe or connection 11, the said connection or pipe being provided with a drain valve 12. The plug of the valve 12 carries an upwardly extending stem 13 which is squared cross sectionally to fit in the squared socket 14 at the lower end of the operating rod 15. The rod 15 extends upwardly through passages formed in the shelf 4 of the bowl 5 and plug 6 and stem 7 respectively and is provided at its extreme upper end with an operating handle 16. The neck 7 of the plug 6 has secured thereto an operating handle 17. The casing 1 is provided with a hot water connection 18 and with a cold water connection 19. These connections are disposed directly opposite to each other and at right angles with the discharge spout 20. The plug 6 is provided with a port which has the branches 21, 22 and 23.

Upon reference to Fig. 3 it will be seen that the branch 21 registers with the connection 18 and the branch 22 registers with the connection 19 whereby both hot and cold water will be permitted to be discharged at the same time through the spout 20. In this position of the port branches, the lever 17 lies directly in line with the spout 20. The flange 10 of the valve casing is provided with an abutment or stop shoulder 24 which is adapted to be engaged by pins 25 and 26 upon the plug 6.

Upon reference to Figs. 2 and 3 of the drawings it will be seen that when the lever 17 is moved clockwise so as to occupy a position between the spout 20 and the connection 18 the spout will be cut off from communication with the plug valve port. Upon further rotation or movement of the lever 17 the port branch 23 of the plug 6 can be brought into registry with the connection 18 and port branch 22 may be brought into registry with the discharge spout. In the last named movement of the plug the pin 25 will be engaged with the abutment or stop shoulder 24 thus limiting the movement of the lever. When the lever 17 is moved anti-clockwise so that it lies between the spout 20 and the connection 19 the port of the plug 6 will be cut off from communication with the water inlet connections, but when the lever is moved beyond this point and the pin 26 engages the shoulder 24 the branches 23 and 21 will register with the connection 19 and discharge spout 20 respectively. In view of the construction just described it will be seen that I provide simple and novel means whereby either hot or cold water or both may be discharged from my improved faucet. The operating rod 15 can be revolved by the actuating lever 16 to open or close the valve 12.

In the form of the invention shown in Fig. 4 the faucet 27 embodies a casing 28 which is adapted to be engaged with a beer barrel or the like. In this form the support 29 carries the member 30 which is identical with the member 3. The member 30 is operatively connected with the casing 28 as clearly shown. The casing is identical with the one described in the preferred form of my invention with the exception of the plug 31. The plug is different in that it is of solid structure and does not receive the valve actuating rod as shown at 15 and described in the foregoing. The plug 31 carries a stem 32 upon which is secured an operating handle 33. In the form shown in Fig. 4 it will be appreciated that the port branches of the plug 31 can be independently brought into registration with the connections in which different forms of beverage may be discharged. In this manner either light or dark beer can be discharged from the same faucet.

In the form of my invention shown in Figs. 5 and 6, the valve casing 34 is provided with hot and cold water inlet pipes 35 and 36 and a discharge pipe 37 which is disposed at right angles to the pipes 35 and 36. The pipes 35 and 36 are preferably arranged in opposing relation, as shown. The plug 38 of the valve is formed with a port having branches 39, 40 and 41. Upon reference to Fig. 5 it will be seen that the port branch 41 registers with the outlet pipe 37 and the port branches 39 and 40 register with the hot and cold water inlet pipes 35 and 36 respectively. In this position of the valve plug equal amounts of hot and cold water can be discharged from the valve as will be understood. The construction of the valve in this form of my invention is such that the plug can be rotated to cause the portions 42, 43 and 44 to assume the dotted line positions, the portion 42 being moved approximately half-way across the inlet end of the pipe 35 and the portion 43 is disposed midway between the pipes 36 and 37, entirely uncovering the former. When the plug is in this position a greater quantity of cold water will be discharged from the pipe 37 and a less quantity of hot water. If desired the portion 42 of the plug may be moved to entirely close the pipe 35 to permit the sole discharge of cold water from the valve. On the other hand should it be desired that hot water be discharged from the valve the portion 43 of the plug may be moved to close the pipe 36. The plug 38 is provided with a lug 45 which is designed to engage a stop 46 on the casing 34 to limit the rotation in either direction of the plug.

The faucet described above while being designed particularly in use in connection with shower baths or the like may be advantageously used as a beer faucet, it being understood that the inlet pipes may be obviously connected to kegs containing light or dark beer.

In Fig. 7 of the drawings, a bracket 47 of angle form is provided and is adapted to be connected in any suitable manner to any suitable support. The arm or base portion 48 of the bracket has formed integrally therewith an interiorly threaded sleeve 49 which is adapted to receive the correspondingly threaded end portion of the valve casing 50. The casing has removably engaged therewith a cap member 51 which is identical in construction with the cap member described in the preferred form of my invention. The exteriorly threaded neck 52 of the casing has mounted thereon a jam or locking nut 53 which is adapted to be frictionally engaged with the cap member to hold it against rotation. The casing 50 in this form of my invention is provided with a threaded aperture 54 which is adapted to receive either the nozzle 55 shown in Fig. 8 or the nozzle 56 shown in Fig. 9.

I claim:—

A valve comprising a support having an interiorly threaded portion, a casing having an exteriorly threaded lower portion engaged in the threaded portion of the support, an exteriorly threaded flange at the upper end of the casing, a cap interiorly threaded to receive the said flange, a rotatably mounted plug mounted in the casing, a handle secured to the plug, a discharge nozzle opening at its inner end directly onto the plug, liquid inlet connections secured to the casing and opening directly onto the plug, the said plug having a port formed therein provided with branches for independent or multiple registration with the nozzle and with the liquid inlet connections of the casing, and coöperating stops on the plug and flange of the casing respectively for limiting the rotary movement of the plug.

In testimony whereof I affix my signature in presence of two witnesses.

CHARLES A. PRIDE.

Witnesses:
 E. L. LEE,
 L. HORNER.